United States Patent Office 2,773,539
Patented Dec. 11, 1956

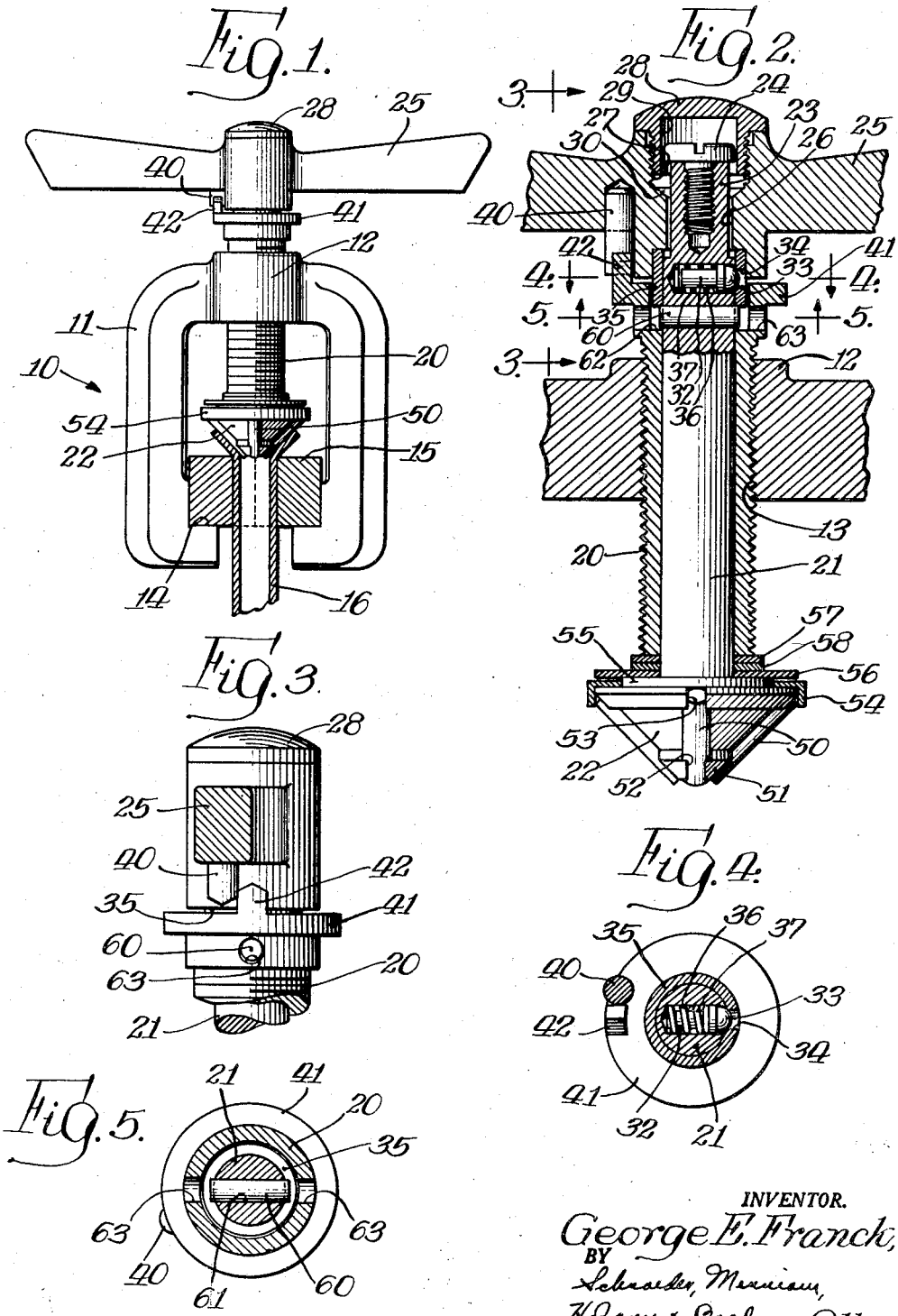

2,773,539

TUBE FLARING TOOL

George E. Franck, Riverside, Ill., assignor to The Imperial Brass Manufacturing Company, a corporation of Illinois Application September 26, 1951, Serial No. 248,428

2 Claims. (Cl. 153—81)

This invention relates to a flaring means and more particularly to a flaring tool for flaring the end of a tube.

It is the general object of this invention to produce a new and improved tube flaring tool.

It is a more specific object of this invention to produce a tube flaring tool capable of producing the desired flare on the end of a tube and provided with means for burnishing the flared end of the tube to produce a smooth and even flare.

Another object of the invention is to produce a tube flaring tool including a tube flaring cone and provided with means for rotating the cone while simultaneously advancing the cone toward the end of a tube to flare the same and including means for rotating the cone without advancing or retracting it to burnish the end of a tube after the desired degree of flare has been produced thereon.

A more specific object of the invention is to produce a tube flaring tool including a fitting having as internally threaded opening in which there is mounted an externally threaded hollow shaft rotatably supporting a rod which carries the flaring cone and to provide a lost-motion connection between the rod and the hollow shaft so that the cone can be rotated and simultaneously advanced to flare the end of a tube and to provide such a device with means for interrupting or breaking the connection between the rod and the shaft to permit rotation of the cone without advancing or retracting it to burnish the end of a tube.

Yet another object of the invention is to provide, in a tube flaring tool of the type described above, an anti-friction bearing in the form of washers of dissimilar metal between the end of the hollow shaft and the cone to permit ease of rotation of the cone during the burnishing operation wherein relative motion between the cone and the hollow shaft is produced.

A still further object of the invention is to produce a tube flaring tool provided with a fitting in the form of a yoke having an internally threaded opening at its apex and carrying in the opening a hollow shaft having external threads engaging the threads in the opening with the hollow shaft rotatably supporting a cylindrical rod which carries at one end a handle and at the other end a tube flaring cone and to provide means for rotating the hollow shaft with rotation of the handle in the form of a pin carried by the handle and movable in a circular path with rotation thereof and a second pin fixed to the hollow shaft and positioned in said path to provide a lost-motion connection between the handle and the hollow shaft, the handle being so constructed and arranged as to permit movement of the pin carried thereby out of its normal path of travel so that the handle may be rotated without contact between the pins to permit the cone to be rotated without rotation of the hollow shaft.

Other and further objects of the invention will be readily apparent from the following description and drawings, in which:

Fig. 1 is a side elevation of a tube flaring tool embodying the invention;

Fig. 2 is a vertical section through the upper portion of the device shown in Fig. 1;

Fig. 3 is a side elevation of the upper portion of the device shown in Fig. 1 and taken along the line 3—3 of Fig. 2; and Figs. 4 and 5 are vertical sections taken respectively along the lines 4—4 and 5—5 of Fig. 2.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Flaring devices of many types have been designed for producing a flare on the end of a tube which is to be coupled to another tube or to a fitting. Many of such tools include a tube flaring cone together with means for rotating the cone while simultaneously advancing it against the end of a tube until the desired flare has been produced. The action of the cone on the end of the tube often produces a roughened surface and this is particularly marked where the entire surface of the cone does not contact the tube but rather contact is produced at points or areas equally spaced around the tube. It has been observed that each of such areas produces an undesirable indentation or shoulder at its point of farthest advance.

It has been found that if means are provided for rotating the cone against the flared end of the tube after the desired flare has been obtained and without advancing the cone, that substantially all imperfections in the flare are ironed or burnished out. One means for automatically providing for burnishing is by the use of a lost-motion connection between the means used for rotating the cone and the means for advancing it such as shown in my co-pending application Serial No. 206,993, filed January 20, 1951, and issued May 3, 1955 as Patent No. 2,707,511.

The lost-motion connection described and claimed in said application, however, permits rotation of the cone without advancing or retracting it through something less than 360° to burnish the end of the tube. It has been found that in some cases and with some metals it is advantageous to provide for several complete rotations of the cone against the flared end of the tube in order to burnish completely and the provision of means for accomplishing such rotation of the cone is one of the principal features of this invention.

It has further been found that because of the thrust which the cone exerts during the furnishing operation there is a tendency for the friction created thereby to cause operation of the means for advancing or retracting the cone and thus to defeat the burnishing operation. This is particularly true where the cone contacts the flared end of the tube only at points or areas spaced about its surface. Accordingly, it has been discovered that the use of washers of dissimilar metal, preferably two bronze washers and an intermediate steel washer, reduces the friction to the extent that the cone may be rotated many times without altering its position relative to the flared end of the tube.

The features of this invention discussed above have been embodied in a tube flaring cone which, as shown in the drawings, includes a fitting 10 in the form of a yoke 11 having an enlarged boss-like portion 12 formed at its apex, with such portion being provided with an internally threaded opening 13. The lower portion of the yoke is provided with a step 14 adapted to support a tube clamping device, such as the tube clamping device 15. As is well known in the art, the tube clamping device serves to hold a tube 16 firmly in position for flaring.

Mounted within the opening 13 is a hollow shaft 20 provided with external threads engaging the threads in the opening and rotatably supporting a solid rod 21 which carries at its lower end a tube flaring cone 22. The upper end of the rod 21 is provided with an integral squared portion 23 having an internally threaded opening to receive a locking screw 24. Mounted on the squared portion 23 of the rod 21 is a handle 25 to provide the means for rotating the rod and hence the cone. The handle 25 is provided with a squared opening 26 to engage the squared portion 23 of the rod and is also provided upwardly of the opening 26 with a larger internally threaded opening 27 into which is threaded a cap or retaining member 28. The member 28 is provided with a cylindrical recess 29 slightly larger in size than the diameter of the head of the screw 24. Inasmuch as the cylindrical recess 29 is slightly larger than the diameter of the head of the screw 24 it can be seen that the handle may be moved outwardly of the rod 21. Thus, in effect, the squared portion 23 of the rod 21 cooperates with the squared opening 26 of the handle to key the handle to the rod so that rotation of the handle produces rotation of the rod and cone but the handle itself may be moved inwardly or outwardly relative to the rod. The extent of the outward movement of the handle relative to the rod 21 is determined by engagement of the head of the screw 24 with a sloping annular shoulder 30 provided in the handle and joining the threaded opening 27 with the squared opening 26.

The handle 25 is normally retained in the inward position shown in the figures by a detent arrangement which includes a small shaft 32 provided with a detent ball 33 on one end thereof engageable in an opening 34 provided in a sleeve 35 secured to the handle 25. The detent is mounted in a suitable opening 36 provided in the upper portion of the rod 21 and is urged outwardly into engagement with the hole 34 by a compression spring 37.

Secured to the handle adjacent its axis of rotation is a pin 40 which is movable in a circular path with rotation of the handle. Located in that path, and secured to a collar 41 in turn secured to the hollow shaft 20, is a second pin 42. Thus rotation of the handle when in the normal position shown in Fig. 2 brings the pin 40 into contact with the pin 42 to rotate the hollow shaft 20 and hence to move the cone toward or away from a tube held in the tube clamping means.

As previously noted, the two pin arrangement just described provides a lost-motion connection so that after the desired degree of flare has been produced on the end of a tube by rotating the handle in one direction, reverse rotation of the handle will rotate the cone slightly less than 360° to burnish the end of a tube before the pin 40 makes contact with the opposite side of the pin 42 to cause withdrawal of the cone.

In the arrangement shown in the drawings, however, the handle 25 may be retracted or pulled outwardly, disengaging the detent 33 until the pin 40, with rotation of the handle, travels in a path which does not intercept the pin 42. As the pins constitute the driving connection between the handle and the hollow shaft, it is clear that with the handle moved outwardly, the cone may be rotated through as many revolutions as desired to provide for proper burnishing without advancing or retracting the cone. When the burnishing has been completed, the handle may be pushed inwardly until the detent engages at which time rotation of the handle in the reverse direction will bring the pins into contact to rotate the shaft 26 and hence to retract the cone from the flared end of the tube.

The cone 22 does not engage or contact the tube about its entire surface but rather is provided with three equally spaced rollers 50 which contact the tube. The rollers are held at the apex of the cone by a retaining device 51 provided with suitable bearing surfaces 52 rotatably supporting the apex end of the rollers and the cone itself is provided with bearing surfaces 53 adjacent the other end of each of the rollers to support such end. The rollers are slipped into the retaining device 51 and held in the bearings 53 by a flanged member 54 mounted on the cone.

It has been found that with the particular construction just described rotation of the cone to burnish the end of a tube is apt to cause rotation of the shaft 20 because of the thrust exerted by the cone against the shaft during the burnishing operation. During the flaring operation the threaded shaft 20 is rotated with the cone and thus the rollers are being rotated and simultaneously advanced. When the flaring is completed, the end of the tube is not uniform as, with the rollers at their farthest point of advance, the area intervening between rollers has a shallower flare equal to the amount the cone has advanced during the final one-third revolution of the shaft 20. Thus during the initial independent rotation of the cone the areas between the farthest point of advance of each of the rollers must be further flared. Because of this fact the first 120° of rotation of the cone in the burnishing operation produces considerable thrust which, because of the frictional engagement between the cone and the threaded shaft, may produce rotation of the shaft. Any rotation of the shaft 20 obviously either increases the flare on the tube or decreases the pressure between the cone and the tube (depending upon which way the handle is rotated during the burnishing) and either result is undesired. To permit the burnishing it has been necessary to supply an antifriction bearing between the cone and the end of the threaded shaft and it has been discovered that the use of a sandwich of three washers, two of bronze and one of steel with the steel washer interposed between the bronze washers, provides a bearing fully capable of accepting the thrust exerted by the cone and yet reducing the friction to the extent where the handle not only is easily rotatable but may be rotated without fear of rotating the threaded shaft. It has been found that other combinations of dissimilar metals such as one bronze and one steel washer will not produce this result.

Such an antifriction bearing is shown in the drawings from which it can be seen that the base portion of the cone is provided with an annular bearing surface 55 upon which rests a bronze washer 56. The lower end of the shaft 20 bears against a second bronze washer 57 which in turn bears against a steel washer 58 interposed between the two bronze washers.

The cone and its associated washers serve also to hold the rod within the hollow of the shaft against longitudinal movement in one direction relative to the shaft 20. To prevent relative longitudinal movement of the rod in the other direction it is provided with a pin 60 press fitted in an opening 61 in the rod and having a length in excess of the diameter of the rod so that the opposite ends of the pin rest upon an annular shoulder 62 formed in the shaft 20. The pin may be inserted after assembly of the tool through openings 63 provided in the shaft 20.

I claim:

1. A tube flaring tool comprising: a fitting member having an opening; a hollow shaft member extending rotatably through the opening; a rod member extending rotatably through the shaft member and having a flaring element at one end; interengaging threads on two of said members arranged, when relative rotation is effected therebetween, to effect axial movement of the rod member relative to the fitting member; operating means including a handle portion axially movable, non-rotatively secured to the other end of the rod for rotating the same, and separable, co-acting elements associated with the handle portion and the shaft member and so arranged that the shaft member rotates when the handle portion is rotated while in one axial position on the rod and remains fixed when the handle portion is rotated while in another axial position on the rod, thereby effecting alternatively combined rotative and axial movement of the rod and unlimited rotative movement of the rod without conjoint axial movement thereof, said elements having a lost motion connection permitting limited rotation of the rod without relative rotation of the members having said interengaging threads when said handle portion is axially positioned to permit co-action between said elements; means for limiting axial movement of the handle portion relative to the rod including an element on said rod having a portion projecting laterally from the rod and arranged to abut a stop shoulder on the handle portion when the handle portion is axially positioned to separate said elements; and means for yieldingly retaining the handle portion in a desired axial position on the rod including spring detent means on said rod and cooperating means connected to the handle portion.

2. A tube flaring tool comprising: a fitting member having an opening; a hollow shaft member extending rotatably through the opening; a rod member extending rotatably through the shaft member and having a flaring element at one end; interengaging threads on two of said members arranged, when relative rotation is effected therebetween, to effect axial movement of the rod member relative to the fitting member; operating means including a handle member axially shiftable relative to said hollow shaft and rod members and non-rotatably secured to the other end of the rod member for rotating the same, and axially separable, coacting elements associated with the handle member and the hollow shaft member and so arranged that the hollow shaft member rotates when the handle member is rotated while in one axial position on the rod member and remains stationary when the handle member is rotated while in another axial position on the rod member, thereby effecting, alternatively, combined rotative and axial movement of the rod member and unlimited rotative movement of the rod member without conjoint axial movement thereof, said elements having a lost motion connection permitting limited rotation of the rod member without relative rotation of the members having said interengaging threads when said handle member is axially positioned to permit coaction between said elements; and means for limiting axial movement of the handle member relative to the rod member including a projection on one of said handle and rod members extending laterally therefrom, and a cooperating stop shoulder on the other of said members against which said projection abuts when the handle member is axially positioned to separate said elements.

References Cited in the file of this patent
UNITED STATES PATENTS

| | | |
|---|---|---|
| 514,684 | Pessano | Feb. 13, 1894 |
| 734,273 | Lovekin | July 21, 1903 |
| 1,009,609 | Wenneborg | Nov. 21, 1911 |
| 1,403,684 | Halvorsen | Jan. 17, 1922 |
| 1,680,798 | Maupin | Aug. 14, 1928 |
| 1,752,508 | Schultis | Apr. 1, 1930 |
| 1,795,358 | Arndt | Mar. 10, 1931 |
| 1,829,557 | Ewing | Oct. 27, 1931 |
| 2,089,133 | Parker | Aug. 3, 1937 |
| 2,277,410 | Neukirch | Mar. 24, 1942 |
| 2,604,139 | Franck | July 22, 1952 |
| 2,707,511 | Franck | May 3, 1955 |
| 2,711,771 | Wilson | June 28, 1955 |

FOREIGN PATENTS

| | | |
|---|---|---|
| 8,632 | Austria | Aug. 11, 1902 |